United States Patent
Moss et al.

[11] Patent Number: 5,969,939
[45] Date of Patent: Oct. 19, 1999

[54] COMPUTER WITH DOCKING STATION FOR DOCKING AND COOLING THE COMPUTER

[75] Inventors: David L. Moss; Andrew Moore, both of Austin, Tex.

[73] Assignee: Dell USA, L.P., Round Rock, Tex.

[21] Appl. No.: 08/889,287

[22] Filed: Jul. 8, 1997

[51] Int. Cl.⁶ .............................. G06F 1/16; H05K 7/10; H05K 7/20
[52] U.S. Cl. .......................... 361/686; 361/687; 361/690
[58] Field of Search ................... 361/683, 686, 361/687, 724, 690

[56] References Cited

U.S. PATENT DOCUMENTS

| | | | |
|---|---|---|---|
| 5,290,178 | 3/1994 | Ma | 361/686 |
| 5,313,596 | 5/1994 | Swindler et al. | 361/725 |
| 5,347,425 | 9/1994 | Herron et al. | 361/683 |
| 5,396,400 | 3/1995 | Register et al. | 361/686 |
| 5,402,310 | 3/1995 | Penniman | 361/686 |
| 5,436,792 | 7/1995 | Leman et al. | 361/686 |
| 5,450,271 | 9/1995 | Fukushima et al. | 361/686 |
| 5,452,180 | 9/1995 | Register et al. | 361/686 |
| 5,463,742 | 10/1995 | Kobayashi | 361/686 |
| 5,477,415 | 12/1995 | Mitcham et al. | 361/686 |
| 5,488,572 | 1/1996 | Belmont | 361/683 |
| 5,526,493 | 6/1996 | Shu | 395/281 |
| 5,535,093 | 7/1996 | Noguchi et al. | 361/686 |
| 5,550,710 | 8/1996 | Rahamim et al. | 361/687 |
| 5,552,959 | 9/1996 | Penniman et al. | 361/686 |
| 5,568,359 | 10/1996 | Cavello et al. | 361/686 |
| 5,579,528 | 11/1996 | Register | 395/671 |
| 5,619,398 | 4/1997 | Harrison et al. | 361/686 |
| 5,694,292 | 12/1997 | Paulsel et al. | 361/686 |
| 5,704,212 | 1/1998 | Erler et al. | 361/687 |
| 5,768,101 | 6/1998 | Cheng | 361/687 |

*Primary Examiner*—Lynn D. Feild
*Assistant Examiner*—Lisa S. Lea-Edmonds
*Attorney, Agent, or Firm*—Haynes and Boone, LLP

[57] ABSTRACT

A portable computer and a docking station and method in which a portable computer is effectively cooled while being docked. The docking station is provided with a heat conductive surface, and the computer is docked in the docking station with a surface of the computer in engagement with the heat conductive surface. The heat conductive surface functions to conduct heat away from the computer.

11 Claims, 4 Drawing Sheets

COMPUTER WITH DOCKING STATION FOR DOCKING AND COOLING THE COMPUTER

TECHNICAL FIELD

The invention relates generally to the field of computers, and more particularly to a portable computer and a docking system for docking and cooling the computer.

BACKGROUND

With the increasing demand, from a performance standpoint, on portable computers, such as notebook computers, laptop computers, personal digital assistants, and the like, it is becoming increasingly difficult to keep the temperature of the computer below an acceptable value. This problem is compounded by an increased demand for power which requires additional batteries that generate additional heat and take up extra space.

Passive cooling of a portable computer is preferred due to increased battery time, reliability and reduced noise. Since much of a portable computer's passive cooling is accomplished through the keyboard and palmrest areas, the heating problem becomes even more acute when the computer is docked in a docking station since, when docked, the display is generally closed, essentially blocking the cooling path through the keyboard and palmrests.

The docking stations themselves also contribute to the cooling problem since they are usually fabricated from a plastic material and use a tray to provide gross alignment between a connector on the docking station and a mating connector on the computer. Due to assembly tolerances, most docking connectors are located slightly higher than the computer connector, causing the computer to be lifted above the tray when connected. Also, since it is generally objectionable to slide a large portion of the computer over the docking surface at the risk of wear to the plastic surface, docking stations often use rails to minimize the sliding contact or rely on the notebook feet as the slide surface. In both of these designs, an air gap is created between the notebook and the docking station which acts as an insulator and thus minimizes the transfer of heat from the computer. Also, since plastic is a poor heat conductor, the possibility of removing any heat from the bottom surface of the notebook by heat conduction is further reduced.

At least one form of dock-assisted cooling has been proposed to lower the temperature of the docked portable computer to an acceptable value. In these designs, a rear-mounted cooling fan is provided on the computer to draw air into the computer and exhaust it to the rear, and the docking station has a matching duct with a fan in order to serially pull more air through the computer. Although this does, in fact, lower the temperature of the docked computer, it is a less than optimum solution for several reasons. For example, fans traditionally have a relatively high failure rate and are noisy. Also, the notebook "exhaust" point takes up valuable real estate in the interior of the computer, and minimizes design flexibility.

Therefore what is needed is a portable computer and a docking station for the computer in which the temperature of the computer is reduced during docking without the disadvantages discussed above.

SUMMARY

Accordingly, an embodiment of the present invention is directed to a portable computer and a docking station and method in which a portable computer is effectively cooled while being docked. To this end, the docking station is provided with a heat conductive surface and the computer is docked in the docking station with a surface of the computer in engagement with the heat conductive surface. The heat conductive surface functions to conduct heat away from the computer.

Several advantages are thus provided by the above embodiment of the present invention. For example, by eliminating the insulative air gap and providing direct conduction to a good heat conductor such as metal, the internal heat from the portable computer is given an efficient path to travel from the interior of the computer, through the computer housing and to the heat conductive surface. Also, this is achieved while the internal paths of the heat to the bottom of the computer are not altered.

DETAILED DESCRIPTION OF THE PREFERRED EMBODIMENT

Figure 1:
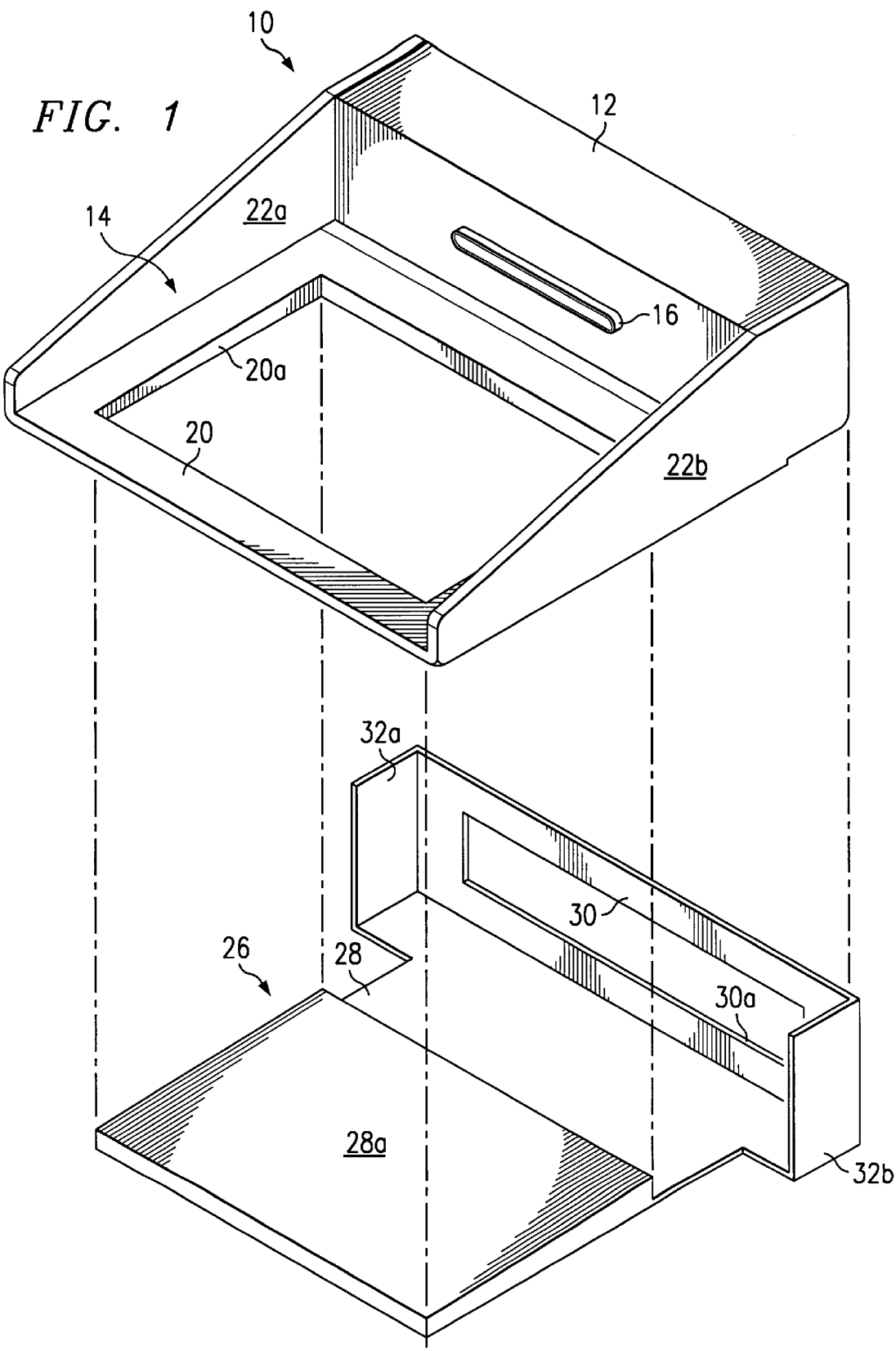
FIG. 1 is an exploded front isometric view of an embodiment of the docking station according to an embodiment of the present invention.
Figure 2:
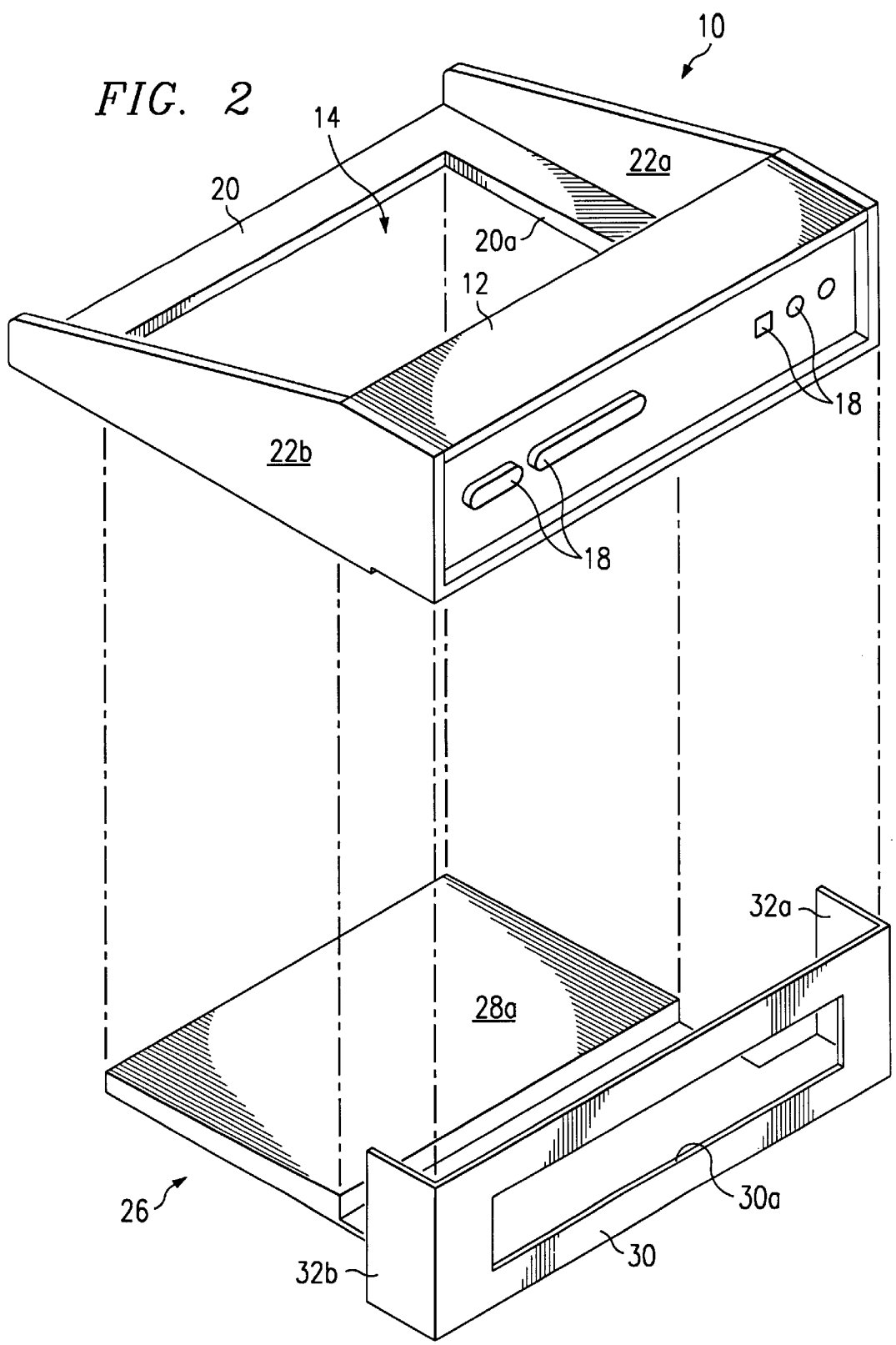
FIG. 2 is an exploded rear isometric view of the docking station of FIG. 1.

Referring to FIGS. 1 and 2 of the drawings, the reference numeral 10 refers, in general, to a docking station for a portable computer (not shown) which can be a notebook computer, a laptop computer, a personal digital assistant, or the like. The docking station 10 is formed by a port replicator 12 connected to, and forming the back wall of, a tray 14. The port replicator 12 has a multipin connector 16 formed in its front wall, as viewed in FIG. 1, and a plurality of connectors 18 (FIG. 2) formed on its rear wall. The connector 16 is for the purpose of receiving a corresponding connector on the portable computer and the connectors 18 are adapted to be connected to peripheral equipment (not shown) such as a printer, a monitor, and the like. Since the connectors 16 and 18 are conventional, they will not be described in any further detail.

The tray 14 is formed by a bottom wall, or plate, 20 having a rectangular through opening 20a and two side walls 22a and 22b. As shown in FIG. 2, the port replicator 12 rests on the rear portion of the bottom plate 20 and the rear portions of the side walls 22a and 22b of the tray 14 are connected to the corresponding side walls of the port replicator in any known manner. But for the opening 20a in the bottom plate 20 of the tray 14, the port replicator 12 and the tray 14 are conventional, and, as such, are fabricated from plastic.

A heat sink assembly is shown, in general, by the reference numeral 26 and is formed by a bottom plate, or wall, 28, an upright wall 30 extending upwardly from the rear of the plate 28 as viewed in FIG. 1, and two sidewalls 32a and 32b which extend a relatively short distance from the wall 30. The bottom plate 28 has a raised portion 28a with length and width dimensions that are slightly less than those of the opening 20a in the plate 20 of the tray 14. The thickness of the raised portion 28a is equal to, or very slightly greater than, the thickness of the bottom plate 20 of the tray 14. The heat sink assembly 26 is preferably fabricated from a heat conductive material, such as metal.

Figure 3:
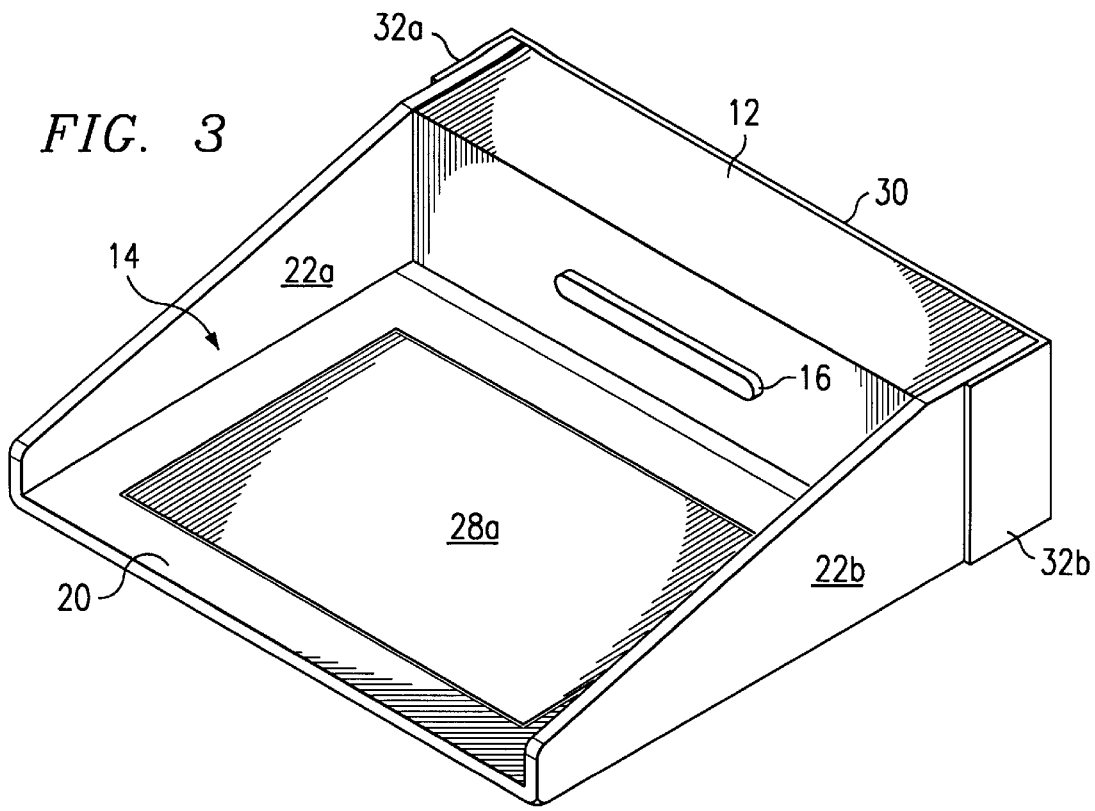
FIG. 3 is a front isometric view of the assembled docking station of FIGS. 1 and 2.
Figure 4:
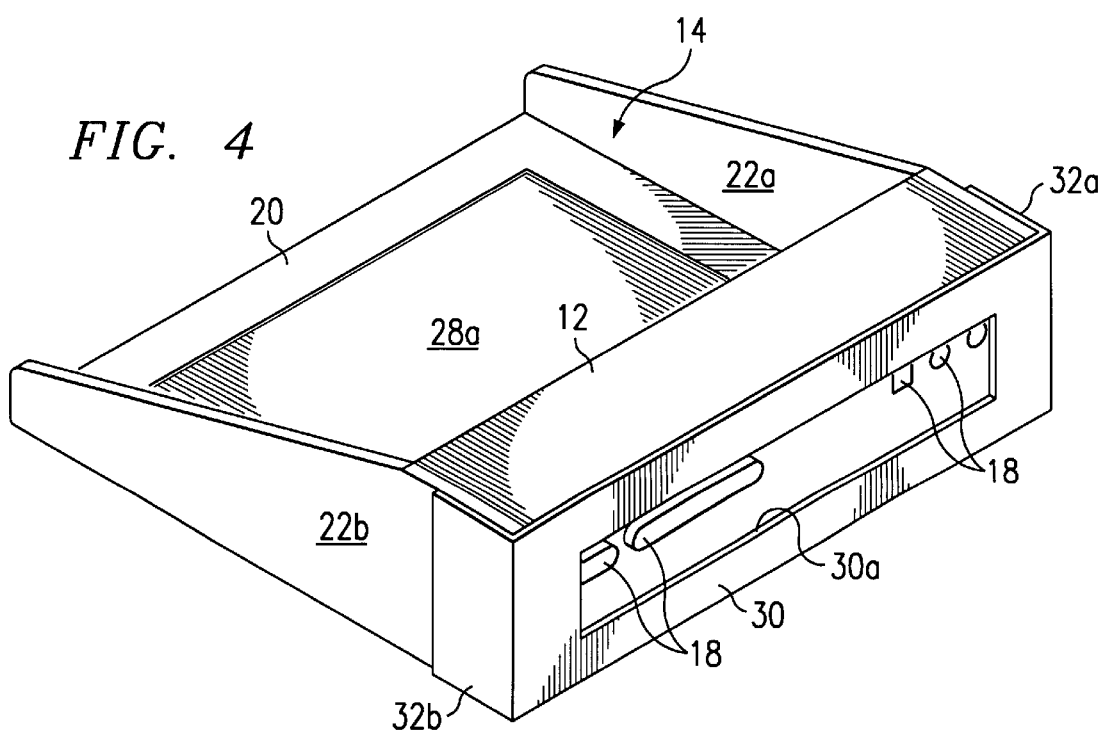
FIG. 4 is a rear isometric view of the assembled docking station of FIGS. 1 and 2.

The docking station 10 is assembled to the heat sink assembly 26 by simply aligning the docking station over the heat sink assembly as shown in FIGS. 1 and 2 and lowering the docking station until it engages the heat sink assembly as shown in FIGS. 3 and 4. In this assembled condition, the raised portion 28a of the bottom plate 28 of the heat sink assembly 26 extends within the opening 20a of the bottom plate 20 of the tray 14 of the docking station 10, with the upper surface of the raised portion 28a extending flush with, or just slightly above, the upper surface of the bottom plate 20. Also, the rear wall 30 and the side walls 32a and 32b of the heat sink assembly 26 extend over the rear wall and the respective side walls of the port replicator 12. As a result, the docking station 10 is mounted to the heat sink assembly 26 in a manner to prevent any lateral movement therebetween. As shown in FIG. 4, the opening 30a in the wall 30 of the heat sink assembly 26 permits access to the connectors 18 formed on the rear of the port replicator 12 thus permitting connection, in a conventional manner, to cables extending from peripheral equipment, such as a monitor, a printer, or the like.

Figure 5:
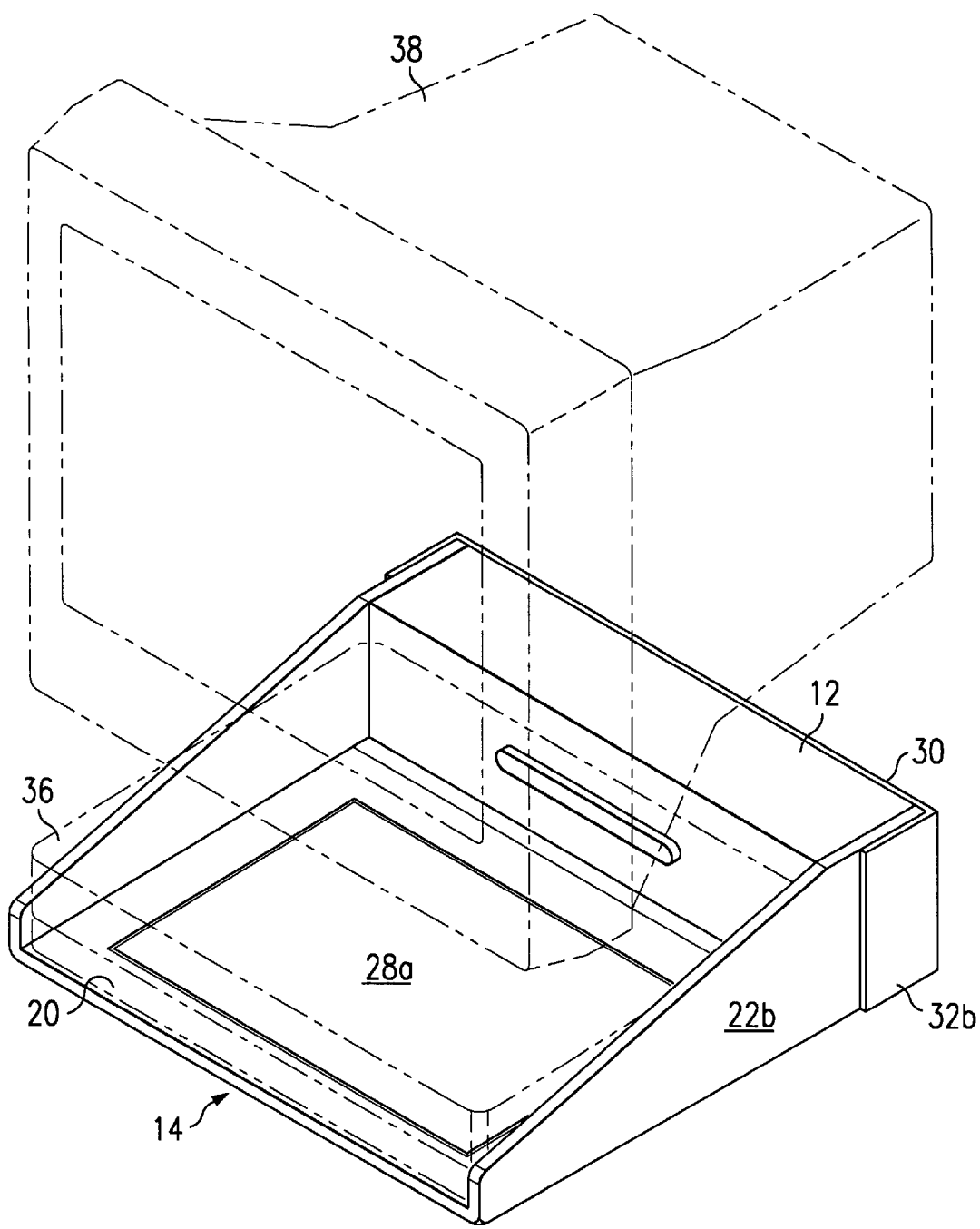
FIG. 5 is a view similar to FIG. 3 but depicting a portable computer docked in the docking station of FIG. 3.

FIG. 5 depicts a portable computer 36 docked in the docking station 10 which, in turn, is mounted in the heat sink assembly 26 as shown in FIGS. 3 and 4. To mount the computer 36 in the docking station the computer is placed in a spaced relation to the front of the docking station 10 and is generally aligned with the docking station in a vertical and horizontal plane. The computer 36 is then moved towards the docking station 10 with the bottom plate 20 and the raised portion 28a, as well as the side walls 22a and 22b, providing guide surfaces. This movement continues until the connector (not shown) on the rear of the computer 36 engages the connector 16 on the port replicator 12. The design is such that, in the fully docked and connected position, the lower surface of the bottom wall, or plate, of the computer 36 contacts the upper surface of the raised portion 28a of the plate 28. The bottom plate 28, and especially the raised portion 28a function as a heat sink which receives the conducted internal heat from the computer 36 and conducts it away from the computer and along the bottom plate 28 and to the rear wall 30 and the side walls 32a and 32b from which it is convected into the ambient air.

Peripheral equipment, such as a monitor 38 shown as an example, can be connected to the connectors 18, with the port replicator 12 functioning in a conventional manner to transfer the connections from the computer 36 to the equipment.

The embodiment of the present invention described above thus enjoys several advantages. For example, any air gap between the computer and the bottom plate of the docking station is eliminated and a direct heat conductive path is formed to and through the heat sink formed by the raised portion 28a of the bottom plate 28. Since the bottom plate, including the raised portion 28a can be fabricated from a good heat conductive material, such as metal, an efficient discharge path for the internal heat from the computer 36 through the raised portion 28a and the bottom plate 28, and to the back wall 30 and the side walls 32a and 32b, from which the heat is convected to the ambient air. Also, any internal heat flow paths in the interior of the computer are not altered.

Variations may be made in the foregoing without departing from the scope of the invention. For example, heat dissipating fins can be provided on the back wall 30 and the side walls 32a and 32b to aid in convecting the heat from the computer to the ambient air. Also, the docking station 10 could be designed to allow for manufacturing tolerances between it and the portable computers to be docked. For example, a compliant, heat conductive material can be provided on the upper surface of the raised portion 28a of the bottom plate 28 to and/or the plate 28 could be spring loaded vertically.

It is understood that the present invention is not limited to a docking station built around a port replicator but rather could be a full featured station or VCR styled docking station. Also, the particular design of the docking station 10 can be varied as long as it permits contact of the raised surface 28a of the heat sink assembly 26 with a corresponding surface of the computer 36. In this context the present invention is not limited to conducting heat from the bottom surface of the computer 36, since the docking station 10 can be designed to place a heat conductive surface in contact with any surface of the computer. Also, the connector 16 can be disposed on any wall of the docking station 10 including the bottom plate 20 or the bottom plate 28. Further, the docking station 10 and the heat sink assembly 26 do not have to be manufactured separately, but rather can be combined into one unit.

It is also understood that the raised surface 28a can take various sizes and shapes as long as it functions to conduct heat away from the computer. Also, the bottom plate 28 and/or the raised surface 28a can be designed to translate normal to the bottom plate of the computer to and from an extended position in which it engages the computer when the computer is in place, and a retracted position during insertion and removal of the computer 36. In the latter situation, a lever mechanism can be provided to "lock" the computer in its docked position in a conventional manner, and according to the present invention, this mechanism would be designed to also move the bottom plate 28 and/or the raised portion 28a upwardly when the computer is locked in, and downwardly when the computer is unlocked.

It is also understood that the embodiment described above is intended to illustrate rather than limit the invention, and that the present invention can take many other forms and embodiments within the scope of the invention.

What is claimed is:

1. In combination, a computer comprising a housing and a connector extending from the housing; and a docking station for docking the computer, the docking station comprising at least one surface adapted to be engaged by the computer when the computer is docked in the docking station, the surface being of a heat conductive material for conducting heat from the computer, at least one upright wall extending from the surface for receiving the heat conducted from the computer and convecting the heat to the ambient air, a first connector for connecting to the connector of the computer, and a second connector for connecting to peripheral equipment.

2. The combination of claim 1 wherein the docking station further comprises a port replicator, the first and second connectors extending from opposite sides of the port replicator.

3. The combination of claim 2 further comprising a bottom plate extending from the port replicator and two sides walls extending from the bottom plate, to guide the computer into engagement with the docking station.

4. The combination of claim 3 wherein the bottom plate has a through opening and wherein the bottom wall has a raised surface that extends through the opening and engages the computer.

5. The combination of claim 1 wherein the computer is a portable computer and wherein the connectors are adapted to connect the computer to peripheral equipment.

6. In combination, a computer comprising a housing, and a connector extending from the housing; and a docking station having a first connector for connecting to the connector of the computer, and a second connector for connecting to peripheral equipment; and a heat sink assembly connected to the docking station, the heat sink assembly comprising a heat conductive surface adapted to be engaged by the computer when the computer is docked in the docking station, the surface being of a heat conductive material for conducting heat from the computer, and an upright wall extending from the surface of the heat sink assembly for receiving the heat conducted from the computer and convecting the heat to the ambient air.

7. The combination of claim 6 wherein the docking station comprises a bottom wall, and two side walls extending from the bottom wall for guiding the computer, and wherein the upright wall of the heat sink assembly extends over corresponding surfaces of the docking station to secure the heat sink assembly to the docking station.

8. The combination of claim 7 wherein an opening is provided in the bottom wall of the docking station and wherein the heat conductive surface of the heat sink assembly extends through the opening.

9. The combination of claim 8 wherein the computer housing comprises a bottom wall and wherein the heat conductive surface of the heat sink assembly is engaged by the bottom wall of the computer housing.

10. The combination of claim 6 wherein the computer is a portable computer and wherein the connectors are adapted to connect the computer to peripheral equipment.

11. A docking station for docking a portable computer having a connector, the docking station comprising:

- a heat sink having at least one surface adapted to engage the computer when the computer is docked in the docking station, the surface being of a heat conductive material for conducting heat from the computer, and an upright wall extending from the surface of the heat sink assembly for receiving the heat conducted from the computer and convecting the heat to the ambient air;
- a tray for receiving the heat sink, the tray formed by a bottom wall having a through opening for receiving the at least one heat sink surfaces, and two side walls for guiding and retaining the computer; and
- a port replicator, associated with the tray, and having a first connector disposed on one side of the port replicator corresponding to the connector of the computer, and a second connector disposed on another side of the port replicator for connecting to peripheral equipment.

* * * * *